Figure 1:
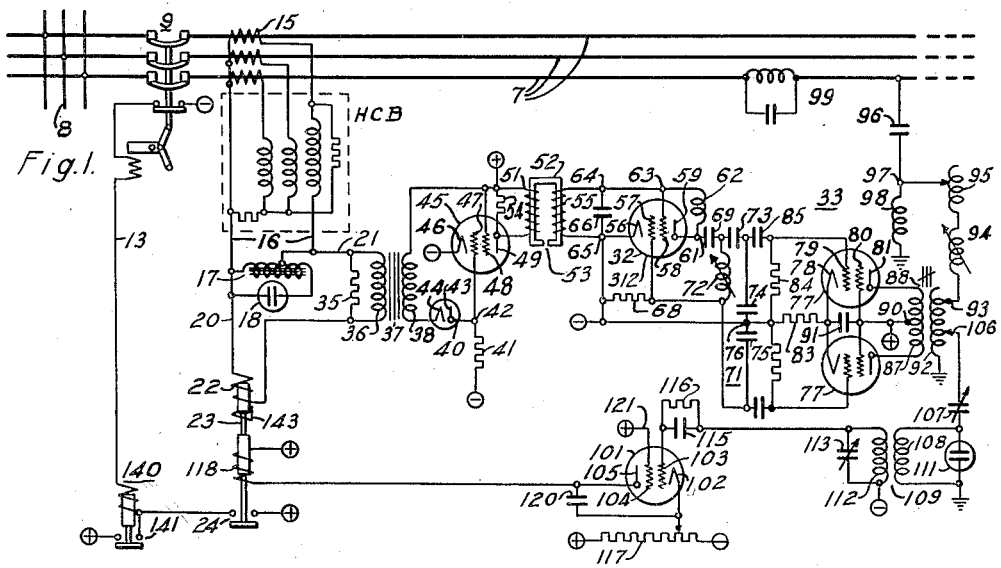

March 10, 1942. B. E. LENEHAN 2,275,971
PILOT-CHANNEL PROTECTIVE RELAYING SYSTEM
Filed Sept. 10, 1940

INVENTOR
Bernard E. Lenehan.
BY O.B.Buchanan
ATTORNEY

Patented Mar. 10, 1942

2,275,971

UNITED STATES PATENT OFFICE 2,275,971

PILOT-CHANNEL PROTECTIVE RELAYING SYSTEM

Bernard E. Lenehan, Bloomfield, N. J., assignor to Westinghouse Electric & Manufacturing Company, East Pittsburgh, Pa., a corporation of Pennsylvania Application September 10, 1940, Serial No. 356,135

28 Claims. (Cl. 175—294)

My invention relates to protective relaying systems such as are employed for protecting transmission-line sections, or other protected electrical apparatus, against faults, and for similar purposes, and it has particular relation to such systems utilizing a pilot-channel or communicating-channel for obtaining a current from some other point in the transmission line for assisting in blocking a line-segregating or sectionalizing operation of a circuit-breaker in the event of a transmission-line fault occurring beyond said other point. The communicating channel may be either a pair of pilot wires, or a tuned high-frequency carrier-current circuit, or any other means whereby intelligence or a signal-current-change may be communicated from one point to another.

In certain of its aspects, my invention is an improvement over the protective relaying system which is described and claimed in an application of Myron A. Bostwick, Serial No. 350,658, filed August 3, 1940, for Pilot-channel protective relaying systems, and also over the protective relaying system which is described and claimed in an application of Shirley L. Goldsborough, Serial No. 356,150, filed September 10, 1940, for Pilot-channel protective relaying systems, both of said applications being assigned to the Westinghouse Electric & Manufacturing Company.

One of the objects of my invention is to provide a protective relaying system utilizing a fault-responsive relay having a fault-responsive operating-means which is energized during successive half-cycles of the fault-current, and having two intermittently pulsating restraining-means responsive to alternate half-cycles of the line-currents at opposite ends or terminals of the protected line or apparatus, each of the intermittently pulsating restraining-means having force-pulsations lasting for approximately one-half cycle of the line-current, with practically zero-force periods between said pulsations, and the pulsations of the two restraining-means which are responsive to currents at opposite ends of the protected apparatus being substantially 180° out of phase with each other in the event of a fault-current flowing through the protected line or apparatus to some external faulted point.

A further object of my invention is to provide a carrier-current relaying system of the class just described, in which a single carrier-current receiver is utilized, at each relaying point, to respond to carrier-current transmitters, of the same frequency, at the respective ends or terminals of a protected line-section, thereby avoiding the trouble and complexity of having transmitters and receivers of different frequencies for segregating the responses at the respective terminals of the protected line-section.

A more specific object of my invention is to provide means for producing or transmitting the intermittent force-pulsations during somewhat more than a half-cycle of the line-current function to which a response is made, so that these pulsations will overlap each other somewhat when there is a through-current passing through the protected line or apparatus, thereby making the protective system less critical of slight phase-displacements of the current-responses at the respective ends of the protected line or apparatus.

Figure 2:
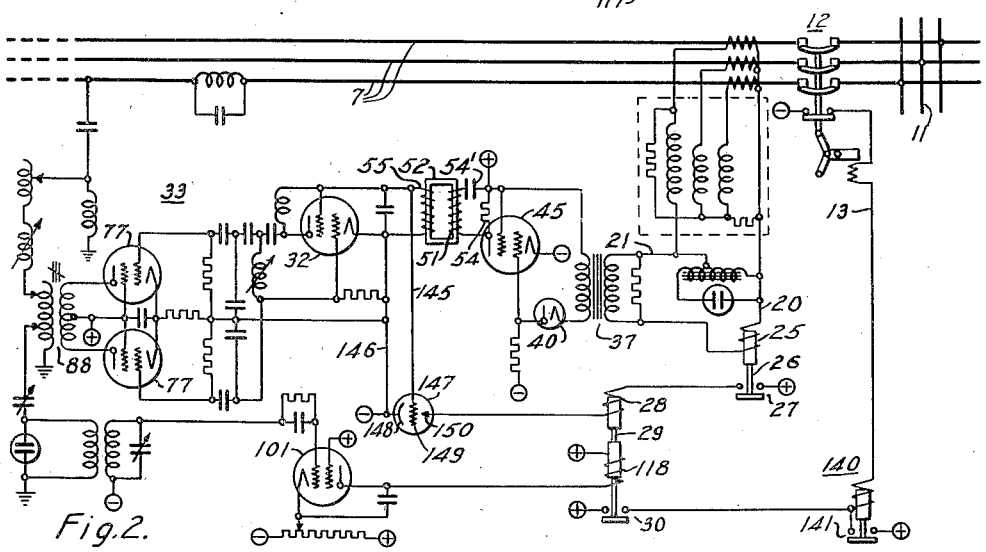

With the foregoing and other objects in view, my invention consists in the apparatus, combinations, systems and methods hereinafter described and claimed, and illustrated in the accompanying drawing, wherein:

Figure 1 is a somewhat simplified diagrammatic view illustrating a preferred form of embodiment of my invention in the terminal protective equipment for one end of a protected transmission-line section;

Fig. 2 is a corresponding view of the corresponding apparatus at the other end of the protected line-section, with certain modifications which have been made for the purpose of further illustrating my invention, although ordinarily the two terminal equipments at the respective ends of the line-section would be identical with each other, in actual service; and Figs. 3, 4, 5 and 6 are wave-form diagrams illustrating the principles of operation of the invention.

In Figures 1 and 2, I have shown my invention, by way of illustration, as being utilized for the protection of a line-section 7 of a three-phase transmission line. The illustrated line-section 7 extends between a station which is shown in Fig. 1, and comprising a bus 8 and a line-segregating circuit-breaker 9, and another station which is shown in Fig. 2 and which comprises a bus 11 and a line-segregating circuit-breaker 12, the circuit-breakers 9 and 12 being utilized for disconnecting the protected line-section from other apparatus represented by the respective buses 8 and 11. Each of the circuit-breakers 9 and 12 is provided with a trip-circuit 13 which, when properly energized, will effect a line-segregating operation of the respective circuit-breaker 9 or 12.

The protective equipments at the two ends of the protected line-section are, for the most part, duplicates of each other, so that a description of one will suffice, in general, for the other. Ordinarily, both terminal protective equipments will be alike, certain variations being shown in the accompanying drawing merely for purposes of illustrating equivalent or alternative constructions.

Each terminal protective equipment comprises a bank of line-current transformers 15 which will be regarded as looking into the protected line-section, that is, as responding to currents flowing into the line-section from its terminal bus. The line-current transformers are utilized to energize a special phase-sequence means or network which is indicated at HCB, and which is designed to provide a single-phase output-circuit 16 in which there will be produced or derived an alternating-current relaying quantity which is nearly enough approximately equally sensitively responsive, in magnitude, to any one of a plurality of different kinds of faults of equal severity, that is, of equal distances from the relaying points, whether the fault be single-phase, polyphase, line-to-line or a ground-fault. The particular phase-sequence network HCB which is illustrated in Figs. 1 and 2 is a combined positive and zero phase-sequence network such as is described and claimed in a Harder Patent No. 2,183,646, granted December 19, 1939, and assigned to the Westinghouse Electric & Manufacturing Company, although I wish my illustration to be construed as being broadly representative of any equivalent apparatus.

The output of the HCB network, consisting of a single-phase relaying-voltage which is delivered in the network-terminals 16, while being nearly enough equal'y sensitive to different kinds of faults, nevertheless varies with the different severities, or distances of the faults from the relaying point. It is preferable, and very desirable, in carrying out my invention, to utilize a voltage-limiting means, connected across the special-phase-sequence output-terminals 16, for the purpose of approximately limiting the magnitude of the relaying voltage which is therein derived. For this voltage-limiting purpose, I have illustrated a saturating iron-core reactor or transformer 17 and a neon lamp or other limited-voltage discharge-tube 18, both connected in parallel-circuit relation to the network-terminals 16, in a manner which is described and claimed in a Bostwick Patent No. 2,183,537, granted December 19, 1939, and assigned to the Westinghouse Electric & Manufacturing Company, although I am not limited to this particular voltage-limiting means.

The combined output of the phase-sequence network HCB and the voltage-limiting means 17—18 is supplied to a relaying-circuit 20—21, to which there is thus applied a single-phase relaying-voltage which, during line-fault conditions, has an approximately (although not absolutely) fixed magnitude, but having a definite time-phase relationship to the line-current at the relaying point, in response to a predetermined phase-sequence function of the polyphase line-current. The wave-form of this approximately constant-magnitude relaying voltage in the circuit 20—21 is approximately sinusoidal, during mild, line-fault conditions, but it is generally quite flat-topped, in its wave-shape, during very severe fault-conditions on the protected line-section 7.

The limited-voltage output of the relaying-circuit 20—21 is utilized primarily for two purposes, in accordance with my invention. The first use of this relaying voltage is to energize a fault-responsive relay-operating means, which is illustrated, in Fig. 1, as the operating-coil 22 of a differential relay 23. The relay 23 may be of any desired type whatsoever, and its illustration, in Fig. 1, is intended only to be schematic, and illustrative of the fact that the coil or winding 22 tends to close the relay-contact 24.

In Fig. 2, the fault-responsive relaying-means which is energized from the relaying-circuit 20—21 is the operating-coil 25 of an auxiliary fault-detector relay 26 which responds, by closing its relay-contact 27, to energize the operating-winding 28 of a differential relay 29 which may be similar to the differential relay 23 of Fig. 1, being utilized to close its relay-contact 30. In Fig. 2, the operating-coil 28 of the differential relay 29 derives its energy from a constant-voltage station-battery which is represented by the battery-terminals (+) and (−).

The second use which is made of the limited relaying-voltage of the relaying-circuit 20—21, in accordance with my invention, is to control the operation of the oscillator-tube 32 of a high-frequency carrier-current transmitter which is indicated, in its entirety, at 33. In accordance with my invention, I desire this carrier-current transmitter-control to be effected in response to a predetermined fault-magnitude, and approximately in response to alternate half-cycles of the relaying-voltage which is produced in the relaying-circuit 20—21. More specifically, I prefer to provide means whereby each of the periods of energization of the oscillator-tube 32 shall last for somewhat longer than a half-cycle of the line-frequency current, although the carrier-transmitting periods may be somewhat less than a half-cycle of the line-frequency current if the differential relay 23 or 26—29 is sufficiently sluggish (relatively speaking), in accordance with the principles of operation which will be subsequently described.

In Figs. 1 and 2, I have shown an exemplary form of transmitter-controlling means of the nature just described, and although this means is, in one sense, a preferred means for this purpose, yet in a broader sense, it is to be regarded merely as representative or illustrative of any one of a plurality of different means which could be utilized for the same, or a similar, purpose.

The output of the locally-responsive relaying-circuit 20—21 is illustrated as being applied to a resistor 35, producing therein a voltage-drop which is utilized to energize the shunt-connected primary winding 36 of a transformer 37 having a secondary winding 38 which is connected in series with a source of constant unidirectional voltage such as the station-battery which is represented by its terminals (+) and (−), the series circuit which includes the transformer-secondary 38 also including a reversely-connected rectifier which is represented as a diode-valve 40, and a resistor 41. Thus, the plate-circuit of the diode-valve 40 may be traced from the negative battery-terminal (−), through the resistor 41, to a point 42 which is connected to the anode 43 of the diode-valve or rectifier 40. The circuit then continues, from the cathode 44 of the valve 40, through the transformer-secondary 38, to the positive battery-terminal (+). It will be noted that this diode-valve or rectifier-tube 40 is in a non-conducting condition with respect to the station-battery (+) and (−), because the station-battery attempts to pass current in the wrong direction therethrough. As a consequence, the rectifier-tube 40 operates as a valve which permits current to flow only during positive half-cycles of the voltage induced in the transformer-secondary 38, and only when that induced voltage exceeds the voltage of the station-battery (+) and (—).

In the illustrated embodiment of my invention, I also utilize a control-tube 45 which is illustrated as comprising a cathode 46, a grid 47, a screen 48 and a plate or anode 49. As shown in Fig. 1, the control-tube plate 49 is connected to the positive battery-terminal (+) through the primary winding 51 of a transmitter-energizing transformer 52 which is illustrated as an iron-core transformer having, in its magnetic circuit, an air-gap 53 for preventing saturation as a result of the direct-current excitation thereof. The primary transformer-winding 51 is permanently shunted by a discharging-resistance 54. In Fig. 2, the air-gap 53 is omitted, and saturation of the transformer 52 is prevented by means of a series capacitor 54' which is connected in series with the primary winding 51 and is parallel to the resistor 54, so as to exclude the direct current from the transformer 52.

The screen 48 of the control-tube 45 is connected to the positive battery-terminal (+), while the grid 47 is connected to the point 42 which is connected to the negative battery-terminal (—) through the resistor 41. The cathode 46 of the control-tube 45 is connected directly to the negative battery-terminal (—).

When the diode-valve or rectifier-tube 40 is non-conducting, so that it draws no current through the resistor 41, the potential of the connecting-point 42, and hence of the control-tube grid 47, is practically exactly that of the negative battery-terminal (—), because the grid 47 carries practically no current at all. Under these circumstances, which I shall refer to as the normal operating-condition, the control-tube grid 47 is at the same potential as its cathode 46, so that said control-tube is normally conducting current from the positive battery-terminal (+) through the primary transformer-winding 51, and thence to the plate 49 of the control-tube, the circuit being completed from the cathode 46 of the control-tube to the negative battery-terminal (—).

The primary transformer-winding 51 is utilized to magnetize a transformer 52 having a secondary winding 55 which is utilized as the equivalent of the B-battery for the oscillator-tube 32 of the carrier-current transmitter 33 which will now be described. The oscillator-tube 32 is illustrated as having a cathode 56, a grid 57, a screen 58 and a plate or anode 59. The anode-cathode circuit or plate-circuit of the oscillator-tube 32 is energized, at periodic intervals, as will be subsequently explained, from the transformer-secondary 55 which serves as an intermittent source of direct-current voltage of the proper polarity. This anode-cathode circuit or plate-circuit of the oscillator-tube 32 may be traced from the plate-terminal 61, through a high-frequency choke-coil 62, to the terminal 63 of the screen 58, and thence to the terminal 64 of the transformer-secondary 55, and finally to the other terminal 65 thereof, which also constitutes the cathode-terminal of the oscillator-tube 32. The transformer-secondary 55 is by-passed by a high-frequency by-passing-capacitor 66. The oscillator-grid 57 is connected to the cathode 56 through a grid-resistor 68.

The high-frequency or oscillating-current output of the oscillator-tube 32 is supplied, through a blocking capacitor 69 to a tuned circuit 71 which comprises a variometer 72 and three capacitors 73, 74 and 75. The junction-point 76 between the capacitors 74 and 75 is connected to the cathode-terminal 65 of the oscillator-tube 32. One terminal of the variometer 72 is connected to the oscillator-grid 57, while the other terminal of the variometer 72 is connected, through the blocking capacitor 69, to the oscillator-plate 59.

The two capacitors 74 and 75 of the tuned circuit 71 of the oscillator are utilized as matched capacitors for energizing a push-pull amplifier-circuit which is illustrated as comprising two identical amplifier-tubes 77. Each of the amplifier-tubes 77 is illustrated as comprising a cathode 78, a grid 79, a screen 80 and a plate 81. The cathodes 78 of the two amplifier-tubes 77 are connected to the common terminal 76 of the coupling-capacitors 74 and 75 through a biasing resistor 83. Each of the amplifier-grids 79 is connected to its cathode 78 through a biasing resistor 84 and the previously-mentioned biasing resistor 83, and each amplifier-grid 79 is also connected to its associated coupling-capacitor 74 through a blocking-capacitor 85. The plates 81 of the two amplifier-tubes 77 are connected to the respective terminals of the primary winding 87 of a radio-frequency transformer 88. The transformer-primary 87 has a midpoint-tap 90 which is connected to the two amplifier-screens 80, and which is coupled to the two amplifier-cathodes 78 through a blocking-capacitor 91. Energy for the amplifier-tubes 77 is obtained from the station-battery which has its positive terminal (+) connected to the midpoint 90, while its negative terminal (—) is connected to the junction-point 76 between the two coupling capacitors 74 and 75.

The output of the radio-frequency transformer 88 is coupled to one of the conductors of the protected line-section 7 by means of a secondary winding 92 of said radio-frequency transformer, one terminal of the secondary 92 being grounded, and a tap 93 being provided to energize a tuned circuit comprising a variometer 94, an adjustable inductance 95 and a coupling-capacitor 96. The common point or junction 97 between the variable inductance 95 and the coupling-capacitor 96 is grounded through a choke-coil 98, while the other terminal of the coupling-capacitor 96 is connected to the line-conductor to which the carrier-current equipment is coupled, the carrier-frequency currents being substantially confined in this line-conductor by means of a carrier-frequency choke or wave-trap 99.

In addition to the carrier-current transmitter which has just been described, I also provide a carrier-current receiver which is illustrated as comprising a receiver-tube 101 having a cathode 102, a grid 103, a screen 104 and an anode 105. The receiver-tube 101 is coupled to the secondary winding 92 of the radio-frequency transformer 88 by means of a tap 106. The portion of the transformer-secondary 92 between its grounded terminal and its tap 106 is coupled to a tuned receiver-circuit comprising a variable capacitor 107 and the primary winding 108 of a coupling-transformer 109. The tuned circuit 107—108, when properly adjusted, is in series resonance, but the inductance or winding 108 is shunted by a neon glow protector lamp 111 which serves to destroy this series resonance when strong carrier-current signals are received, said neon lamp limiting the voltage across the winding 108 to a substantially predetermined fixed amount, such as approximately 150 volts. The coupling-transformer 109 has a secondary winding 112 which is a part of a tuned circuit comprising an adjustable capacitor 113. One terminal of the secondary winding 112 is connected to the negative battery-terminal (—), while the other terminal is connected to the receiver-grid 103 through the grid-capacitor 115 and the grid-resistor 116, the capacitor 115 and resistor 116 being connected in shunt relation to each other.

The receiver-cathode 102 is connected to the negative battery-terminal (—) through a potentiometer 117 which normally biases the grid 103 to a small negative potential with respect to the cathode 102, so that no plate-current normally flows. The receiver-plate or anode 105 is connected to the positive battery-terminal (+) through a restraining-winding 118 which, in Fig. 1, is a part of the differential relay 23, and which, in Fig. 2, is a part of the differential relay 29. The receiver-tube circuits are completed by means of a high-frequency bypass-capacitor 120 which is connected between the plate 105 and the cathode 102, and a connection 121 from the screen 104 to the positive battery-terminal (+).

Figure 3:
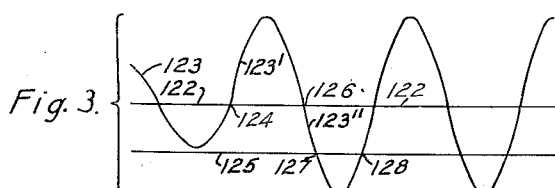

The operation of the illustrated embodiment of my intermittent transmitter-controlling means will first be described, with reference to the curve-diagrams in Figs. 3 to 6. In Fig. 3, the datum-line 122 may be taken as the potential appearing at the positive battery-terminal (+) in Fig. 1 or Fig. 2. This will be the potential of the upper terminal of the secondary winding 38 of the transmitter-controlling transformer 37. The potential of the bottom terminal of the transformer-secondary 38, which is connected to the rectifier-cathode 44, is represented in Fig. 3 by the wave-form 123, which is shown as an approximately sine wave-form, although it may commonly be somewhat flat-topped in its shape. In the time-curve which is represented in Fig. 3, the time up to the point 124 is supposed to represent normal line-conditions when the transmission line 7 is carrying its full rated load-current, without any fault on the transmission line. The voltage of the negative battery-terminal (—) is represented, in Fig. 3, by the straight line 125. It will be noted that the peak-voltage of the transformer-secondary 38, as represented by the line 123, is somewhat smaller than this battery-voltage 125. During the non-conducting condition of the rectifier-tube 40, the battery-voltage line 125 also represents the voltage of the control-tube grid 47, representing a condition when the control-tube 45 is conducting current from the battery.

At the point 124 in the time-curve of Fig. 3, it is assumed that a fault occurs on the transmission line, and that the secondary voltage 123 increases to a certain fault-magnitude which is indicated at 123'. It should be noted, by way of explanation, that the voltage-limiting means 17—18 which is utilized in the local relaying circuit is not absolute in its operation, but permits the relaying voltage to rise very slowly while the fault-current is increasing very rapidly. During alternate half-cycles of the voltage in the secondary winding 38, the winding-voltage 123' adds onto the battery-voltage 125 to make the rectifier-cathode 44 still more positive with respect to its anode-potential which is represented at 125 in Fig. 3. While I have shown this waveform 123', in Fig. 3, as being a positive half-cycle, extending from the point 124 to the point 126, it is also true that if the voltage is considered from the standpoint of the conducting-direction of the rectifier-tube 40, this half-cycle of the transformer-voltage 123' may be regarded and defined as a negative half-cycle.

During the next half-cycle, the potential of the bottom terminal of the transformer-secondary 38, which is the potential of the rectifier-cathode 44, becomes negative with respect to the positive battery-terminal potential 122, as indicated at 123'' in Fig. 3, and at a certain point in this half-wave, as indicated at 127, the potential 123'' of the rectifier-cathode 44 becomes negative with respect to the potential 125 of the negative battery-terminal (—), with the result that, so long as this condition exists, or from the point 127 to the point 128, in Fig. 3, current is flowing from the negative battery-terminal (—) in Fig. 1, through the resistor 41 to the rectifier-anode 43, and thence through the rectifier-tube 40 to the cathode 44, and through the transformer-winding 38 which now serves as a positive source of potential for the rectifier-tube 40, forcing current in the charging direction through the station-battery represented by the terminals (+) and (—).

Figure 4:
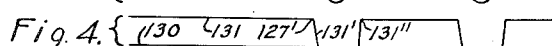

Fig. 4 shows the current-conditions prevailing in the control-tube 45. The straight line 130 is the datum-line, representing zero plate-current conditions, while the plate-current of the control-tube 45 is indicated at 131 in Fig. 4. At a time 127' corresponding to the point 127 in Fig. 3, the control-tube grid 47 begins to become negative with respect to the cathode 46 which is at the negative battery-terminal potential 125 in Fig. 3. Consequently, the plate-current 131 begins to fall rapidly to zero, as indicated at 131' in Fig. 4. When the grid-potential again becomes the same as the control-tube cathode, as at the point 128 in Fig. 3, the plate-current again assumes its normal value as indicated at 131'' in Fig. 4.

Figure 5:
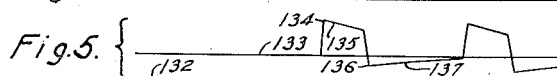

Fig. 5 shows the plate-voltage conditions in the control-tube 45. The datum-line 132 is here taken as the voltage of the negative battery-terminal (—), while the straight line 133 represents the potential of the positive battery-terminal (+) which, during the steady-state conducting-period of the control-tube, is substantially also the voltage of the anode 49 of the control-tube, because under these steady-state conditions, there is very little voltage-drop in the primary winding 51 of the oscillator-energizing transformer 52. When the plate-current of the control-tube 45 suddenly reduces to zero, as indicated at 131' in Fig. 4, the inductance of the primary winding 51 produces a sudden increment of voltage, which raises the plate-voltage of the control-tube to a point which is indicated at 134 in Fig. 5, this increase in voltage being limited by the resistance 54 which is shunted around the primary winding 51. The stored magnetic energy in the winding 51 then commences to discharge through the resistor 54, producing a sloping portion 135 of the plate-voltage curve in Fig. 5. When the control-tube 45 again becomes conducting, so that its plate-current increases to the point 131'' in Fig. 4, the inductance of the transformer-primary 51 again opposes the sudden change in current, reducing the plate-potential of the control-tube 45 to a value such as that indicated at 136 in Fig. 5. Thereafter, the oscillator-energizing transformer 52 begins to gradually build up its normal excitation or magnetization, along a slowly increasing curve indicated at 137 in Fig. 5, which continues until the next non-conducting period of the control-tube 45.

The voltage of the secondary winding 55 of the oscillator-energizing transformer 52 may be regarded as the difference between the curve 134—135—136—137 and the straight-line curve 133, considering the latter as the datum-line for said secondary voltage. The polarities of the connections between the secondary winding 55 and the oscillator-tube 32 are such that a positive plate-voltage is applied to said tube during the period represented by the curve 137 in Fig. 5, that is, when the control-tube 45 is conducting current after a brief period of non-conduction. During this period 137 in Fig. 5, a diminishing plate-voltage is being applied to the oscillator-tube 32, and Fig. 6 shows the oscillations 138 which are produced during this period, the frequency of the oscillations 138 being made far too low, in Fig. 6, in order to be able to show the wave-form at all.

It will be noted, from the foregoing explanation, that I utilize only a portion of alternate half-cycles of the locally-responsive relaying-voltage of the circuit 20—21 to render the control-tube 45 non-conducting, as indicated by the time-period 127—128 in Fig. 3, the time-period 127'—131'' in Fig. 4, and the plate-voltage curve-portion 135 in Fig. 5. Inasmuch as this time-period exists for less than one-half of a cycle of the line-frequency current, the intervening oscillating-periods 137 or 138 of Figs. 5 and 6 must each last for somewhat longer than one-half of a cycle of the line-frequency current.

Figure 6:
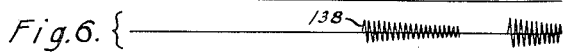

It should be mentioned that the shortness of the non-conducting periods of the control-tube 45 has been somewhat exaggerated in Figs. 3, 4 and 5, which means also that the length of the oscillator-operating periods 137 and 138 has been exaggerated in Figs. 5 and 6, although I am not limited to any precise period. This is because the fault-current wave-form 123'—123'' has been shown in Fig. 3 as a substantially sinusoidal wave, whereas, in actual fact, it is a considerably flat-topped wave, which would shorten the lost-time interval between the beginning of the half-wave 126 in Fig. 3 and the point 127 when the instantaneous value of transformer-voltage becomes equal to the battery-voltage 125.

In order for the oscillator-energizing transformer 52 to operate in the manner above-described, it is only necessary that it should be so designed that its time-constant, or the time-constant of its primary and secondary circuits, should be such that the transformer would slowly discharge and charge, or give up its flux and increase its flux, in the manner approximately as indicated at 135 and 137, respectively, in Fig. 5, without approaching too closely to its steady-state flux-condition 133 by the end of the oscillator-energizing period 137.

Considering the operation of my system from the standpoint of the response of the differential relays 23 and 29, it will be noted that the relay-contacts 24 and 30, respectively, are utilized to energize the tripping circuit 13 at the associated end of the line-section, so as to effect a circuit-interrupting operation of the circuit-breaker. As is customary in such tripping circuits, an auxiliary relay 140 is also utilized, having its operating coil in series with its tripping circuit 13, and having relay-contacts 141 which bypass the more delicate differential-relay contacts 24 and 30, respectively.

It is apparent, therefore, that, whenever either one of the differential relays 23 or 29 responds, it effects a tripping-operation of its associated circuit-breaker 9 or 12, as the case may be. It is essential, therefore, that the differential relays should not respond except during conditions when there is a current of fault-magnitude on the transmission line.

It is to be noted, also, that an initiation of carrier-current transmission is necessary before the differential relays 23 and 29 can receive any electro-responsive restraint (as distinguished from the normal biasing means which may be either a spring or, as illustrated, gravity). The initiation of carrier-current transmission is sensitively responsive to any increase in the flat-topped voltage-output of the transmitter-controlling transformer 37 over and above the constant voltage of the station-battery (+) and (—), as will be understood from the explanation already given in connection with Fig. 3.

As a result of the foregoing considerations, it follows that the differential relays 23 and 29 cannot be permitted to respond, by closing their contacts 24 or 30, during line-current conditions or magnitudes which are less severe than the magnitude which initiates the operation of the carrier-current transmitter 33.

In the case of Fig. 1, where the operating coil 22 of the differential relay 23 is energized directly from the locally-responsive relaying-circuit 20—21, it is necessary for this relay to be less sensitive, to fault-current magnitudes of the relaying-voltage supplied by the relaying-circuit 20—21, than the transmitter-starting means which is under the control of the transformer 37 in cooperation with the station-battery (+) and (—). In other words, without any current in the restraint-winding 118 of the differential relay 23, this relay must not pick up its movable contact member until the relaying-voltage in the circuit 20—21 increases to a value higher than that which is necessary to initiate carrier-current transmission under the conditions explained in connection with Figs. 3 to 6.

In the case of the differential relay 29 which is shown in Fig. 2, the conditions are somewhat different, because of the presence of the auxiliary relay 26 which is responsive to the current in the locally-responsive relaying-circuit 20—21. In this case, the difference in sensitivity or selectivity, as to different severities of fault-conditions, is obtained in the auxiliary relay 26 by adjusting it so that it responds less sensitively, to increases in the relaying-voltage of the circuit 20—21, than the transmitter-initiating apparatus associated with the transformer 37, so that the relay 26 will not pick up until the attainment of magnitudes higher than the voltage-magnitude necessary to initiate carrier-current transmission, or if an extremely high voltage-magnitude is very quickly attained in the relaying-circuit 20—21, the auxiliary relay 26 should respond a trifle more sluggishly, or certainly not materially faster, than the tube-controlled carrier-initiating means.

The underlying consideration, of course, is to make sure that carrier-current is being transmitted at least as soon as the time when the differential relay 23 or 29, in Figs. 1 or 2, would be ready to pick up its tripping-circuit contacts in the absence of the restraint which is applied to the restraining winding 118 through the medium of carrier-current transmission and reception, or if there is any delay in the initiation of carrier-

carrier-current transmission at the end where fault-current magnitudes do not exist, with the result that tripping will occur during the first half-cycle when the restraint-winding 118 is not energized.

In the particular half-wave-responsive transmitter-initiating mechanism which I have illustrated, in connection with the apparatus included between the transmitter-controlling transformer 37 and the oscillator-energizing transformer 52, there may be a delay of approximately a half-cycle of the line-current, or even more, before carrier-current transmission will be first initiated, if, as illustrated in Fig. 3, a fault occurs, as at the moment 124, when a half-cycle of the wrong polarity 123' is about to commence. Under such circumstances, it is necessary to make sure that the differential relay, such as the relay 23 in Fig. 1, shall not respond prematurely, before carrier-current can be initiated at either end of the protected line-section. This may be accomplished, either by the inherent sluggishness of the differential relay 23, or by the addition of suitable time-delay means, such as a short-circuited coil 143 on the magnetic circuit of the operating-coil 22, to prevent a premature response of said relay.

In Fig. 2, however, I have indicated the use of a positive means or safeguard for making sure that the operating-winding 28 of the differential relay 29 cannot become energized before the first half-cycle during which carrier-current is transmitted at the relaying station, so that the response of the differential relay 29 will not, in any event, take place before the next half-cycle after that. Any suitable means may be utilized for the purpose just stated, preferably a means which is responsive to the same voltage which initiates carrier-current transmission.

In Fig. 2, the secondary-winding voltage of the oscillator-energizing transformer 52 is tapped off, as indicated at 145 and 146, and utilized in the control of a cold-cathode glow-discharge tube 147 having a cathode 148, a control-grid 149 and an anode 150. The cold-cathode tube 147 is included in series-circuit relation to the operating winding 28 of the differential relay 29 in Fig. 2, so that the current tends to flow, from the positive battery-terminal (+), through the auxiliary relay-contact 27 and the coil 28, into the anode 150 of the tube 147, and thence from the cathode 148 to the negative battery-terminal (—).

The characteristic of the cold-cathode tube 147 (Fig. 2) is such that, when impressed with a predetermined anode-potential, such as the potential of the station-battery (+) and (—), it will not begin to conduct any material amount of electricity until its grid 149 has been raised to a predetermined positive potential with respect to the cathode 148, the tube-characteristics being such that, once the tube has been "broken down," that is, once the tube has commenced to carry current, it will thereafter continue to carry current independently of the grid-potential (within reasonable limits) as long as the predetermined plate-voltage continues to be applied to the tube. The cold-cathode glow-discharge tube 147 thus operates as a means for making sure that the operating coil 28 of the tripping relay 29 is not energized prior to commencement of carrier-current transmission on alternate half-cycles at the relaying station at which the tripping relay 29 is located. Of course, it will be obvious that, instead of utilizing all of the voltage of the positive half-waves of the transformer-secondary 55 to control the potential of the grid 149, a small portion of such voltage could be tapped off, as by means of a potentiometer or other voltage-dividing means, as will be well understood by those skilled in the art.

While I have illustrated my invention in connection with the protection of a section of a transmission line, and while I have illustrated only two slightly different forms of embodiment thereof, I wish it to be understood that my invention, at least in its broader aspects, is applicable to the protection of other electrical apparatus as well, and that it is susceptible of considerable alteration in regard to its precise form of embodiment and in its range of equivalents. I desire, therefore, that the appended claims shall be accorded the broadest construction consistent with their language.

I claim as my invention:

1. The combination, with an alternating-current transmission-line section to be protected, and line-segregating circuit-interrupting means for disconnecting the line from other apparatus, of line-fault-responsive relaying-means for actuating said line-segregating circuit-interrupting means so as to effect a disconnecting operation; said line-fault-responsive relaying-means being of a type which utilizes a current obtained from some other point in the transmission line for assisting in blocking a line-segregating operation in the event of a transmission-line fault occurring beyond said other point; characterized by said line-fault-responsive relaying-means including electro-responsive relaying-means at the relaying point for effecting a predetermined control over the line-segregating circuit-interrupting means; said electro-responsive relaying-means having an electro-responsive restraining means for developing a restraining force, and an electro-responsive operating means for developing an operative force which is effective to quickly cause the actuation of the electro-responsive relaying-means in the absence of said restraining force; means operative, when predeterminedly energized, to substantially continuously energize said electro-responsive operating means; means responsive approximately to alternate half-cycles of a line-current function at the relaying point for energizing said electro-responsive restraining means approximately during alternate half-cycles of said line-current function at the relaying point; and communicating-channel means responsive approximately to alternate half-cycles of a corresponding line-current function at said other point for energizing said electro-responsive restraining means of the electro-responsive relaying-means at the relaying point approximately during alternate half-cycles of said line-current function at said other point; the approximate half-cycles during which said restraining means is energized in response to line-currents at the relaying point and at said other point, respectively, being approximately in time-phase-opposition with respect to each other, so as to alternate, in the event of a transmission-line fault occurring beyond said other point.

2. The invention as defined in claim 1, characterized by each of the approximate half-cycles of energization of the restraining means in response to the line-currents at the relaying point and at said other point, respectively, being of slightly longer duration than one half-cycle of the line-current so as to provide a certain predetermined amount of overlapping of the approximate half-cycles of restraining-means energization in the event of a transmission-line fault occurring beyond said other point.

3. The invention as defined in claim 1, characterized by said electro-responsive relaying-means including means for insuring the prevention of the effectuation of the aforesaid predetermined control over the line-segregating circuit-interrupting means prior to the first approximate half-cycle of restraining-means energization which is effectuated in response to half-cycles of the line-current function at the relaying point after the occurrence of predetermined line-fault conditions.

4. The combination, with an alternating-current transmission-line section to be protected, and line-segregating circuit-interrupting means for disconnecting the line from other apparatus, of line-fault-responsive relaying-means for actuating said line-segregating circuit-interrupting means so as to effect a disconnecting operation; said line-fault-responsive relaying-means being of a type which utilizes a current obtained from some other point in the transmission line for assisting in blocking a line-segregating operation in the event of a transmission-line fault occurring beyond said other point; characterized by said line-fault-responsive relaying-means including electro-responsive relaying-means at the relaying point for effecting a predetermined control over the line-segregating circuit-interrupting means; said electro-responsive relaying means having an electro-responsive restraining means for developing a restraining force, and an electro-responsive operating means for developing an operative force which is effective to quickly cause the actuation of the electro-responsive relaying-means in the absence of said restraining force; means responsive to the attainment of a predetermined magnitude and approximately to alternate half-cycles of a line-current function at the relaying point for initiating an intermittent energization of said electro-responsive restraining means approximately during alternate half-cycles of said line-current function at the relaying point; means operative not materially prior to the last-mentioned means for initiating a substantially continuous energization of said electro-responsive operating means; and communicating-channel means responsive to the attainment of a predetermined magnitude and approximately to alternate half-cycles of a corresponding line-current function at said other point for energizing said electro-responsive restraining means of the electro-responsive relaying-means at the relaying point approximately during alternate half-cycles of said line-current function at said other point; the approximate half-cycles during which said restraining means is energized in response to line-current at the relaying point and at said other point, respectively, being approximately in time-phase-opposition with respect to each other, so as to alternate, in the event of a transmission-line fault occurring beyond said other point.

5. The combination, with an alternating-current transmission-line section to be protected, and line-segregating circuit-interrupting means for disconnecting the line from other apparatus, of line-fault-responsive relaying-means for actuating said line-segregating circuit-interrupting means so as to effect a disconnecting operation; said line-fault-responsive relaying-means being of a type which utilizes a current obtained from some other point in the transmission line for assisting in blocking a line-segregating operation in the event of a transmission-line fault occurring beyond said other point; characterized by said line-fault-responsive relaying-means including electro-responsive relaying-means at the relaying point for effecting a predetermined control over the line-segregating circuit-interrupting means; said electro-responsive relaying-means having an electro-responsive restraining means for developing a restraining force, and an electro-responsive operating means for developing an operative force which is effective to quickly cause the actuation of the electro-responsive relaying-means in the absence of said restraining force; means sensitively responsive to the attainment of a predetermined magnitude and approximately to alternate half-cycles of a line-current function at the relaying point for initiating an intermittent energization of said electro-responsive restraining means approximately during alternate half-cycles of said line-current function at the relaying point; communicating-channel means sensitively responsive to the attainment of a predetermined magnitude and approximately to alternate half-cycles of a corresponding line-current function at said other point for energizing said electro-responsive restraining means of the electro-responsive relaying-means at the relaying point approximately during alternate half-cycles of said line-current function at said other point; the approximate half-cycles during which said restraining means is energized in response to line-currents at the relaying point and at said other point, respectively, being approximately in time-phase-opposition with respect to each other, so as to alternate, in the event of a transmission-line fault occurring beyond said other point; and less sensitive magnitude-responsive means responsive to successive half-cycles of said line-current function at the relaying point for initiating a substantially continuous energization of said electro-responsive operating means.

6. The combination, with an alternating-current transmission-line section to be protected, and line-segregating circuit-interrupting means for disconnecting the line from other apparatus, of line-fault-responsive relaying-means for actuating said line-segregating circuit-interrupting means so as to effect a disconnecting operation; said line-fault-responsive relaying-means being of a type which utilizes a current obtained from some other point in the transmission line for assisting in blocking a line-segregating operation in the event of a transmission-line fault occurring beyond said other point; characterized by said line-fault-responsive relaying-means including electro-responsive relaying means at the relaying point for effecting a predetermined control over the line-segregating circuit-interrupting means; said electro-responsive relaying-means having an electro-responsive restraining means for developing a restraining force, and an electro-responsive operating means for developing an operative force which is effective to quickly cause the actuation of the electro-responsive relaying-means in the absence of said restraining force; means responsive to the attainment of a predetermined magnitude and approximately to alternate half-cycles of a line-current function at the relaying point for initiating an intermittent energization of said electro-responsive restraining means approximately during alternate half-cycles of said line-current function at the relaying point and for substantially simultaneously performing an operation necessary to an initiation of a substantially continuous energization of said electro-responsive operating means; and communicating-channel means responsive to the attainment of a predetermined magnitude and approximately to alternate half-cycles of a corresponding line-current function at said other point for energizing said electro-responsive restraining means of the electro-responsive relaying-means at the relaying point approximately during alternate half-cycles of said line-current function at said other point; the approximate half-cycles during which said restraining means is energized in response to line-currents at the relaying point and at said other point, respectively, being approximately in time-phase-opposition with respect to each other, so as to alternate, in the event of a transmission-line fault occurring beyond said other point.

7. The combination, with an alternating-current transmission-line section to be protected, and line-segregating circuit-interrupting means for disconnecting the line from other apparatus, of line-fault-responsive relaying-means for actuating said line-segregating circuit-interrupting means so as to effect a disconnecting operation; said line-fault-responsive relaying-means being of a type which utilizes a current obtained from some other point in the transmission line for assisting in blocking a line-segregating operation in the event of a transmission-line fault occurring beyond said other point; characterized by said line-fault-responsive relaying-means including electro-responsive relaying-means at the relaying point for effecting a predetermined control over the line-segregating circuit-interrupting means; said electro-responsive relaying-means having an electro-responsive restraining means for developing a restraining force, and an electro-responsive operating means for developing an operative force which is effective to quickly cause the actuation of the electro-responsive relaying-means in the absence of said restraining force; means operative, when predeterminedly energized, to substantially continuously energize said electro-responsive operating means; means for providing a communicating channel between said relaying point and said other point; means responsive approximately to alternate half-cycles of a line-current function at the relaying point for causing high-frequency current of a predetermined high frequency to be fed into the communicating channel approximately during alternate half-cycles of said line-current function at the relaying point; means responsive approximately to alternate half-cycles of a corresponding line-current function at said other point for causing high-frequency current of said predetermined high frequency to be fed into the communicating channel approximately during alternate half-cycles of said line-current function at said other point; the approximate half-cycles during which said restraining means is energized in response to line-currents at the relaying point and at said other point, respectively, being approximately in time-phase-opposition with respect to each other, so as to alternate, in the event of a transmission-line fault occurring beyond said other point; and attuned receiving-means at the relaying point for energizing said electro-responsive restraining means in response to high-frequency current of said predetermined high frequency in the communicating channel.

8. The invention as defined in claim 7, characterized by each of the approximate half-cycles of high-frequency current-feeding into the communicating channel in response to the line-currents at the relaying point and at said other point, respectively, being of slightly longer duration than one half-cycle of the line-current so as to provide a certain predetermined amount of overlapping of the approximate half-cycles of said currents fed into the communicating channel in the event of a transmission-line fault occurring beyond said other point.

9. The invention as defined in claim 5, characterized by said electro-responsive relaying-means including means for insuring the prevention of the effectuation of the aforesaid predetermined control over the line-segregating circuit-interrupting means prior to the first approximate half-cycle period during which high-frequency current is fed into the communicating channel in response to half-cycles of the line-current function at the relaying point after the occurrence of predetermined line-fault conditions.

10. The combination, with an alternating-current transmission-line section to be protected, and line-segregating circuit-interrupting means for disconnecting the line from other apparatus, of line-fault-responsive relaying-means for actuating said line-segregating circuit-interrupting means so as to effect a disconnecting operation; said line-fault-responsive relaying-means being of a type which utilizes a current obtained from some other point in the transmission line for assisting in blocking a line-segregating operation in the event of a transmission-line fault occurring beyond said other point; characterized by said line-fault-responsive relaying-means including electro-responsive relaying-means at the relaying point for effecting a predetermined control over the line-segregating circuit-interrupting means; said electro-responsive relaying-means having an electro-responsive restraining means for developing a restraining force, and an electro-responsive operating means for developing an operative force which is effective to quickly cause the actuation of the electro-responsive relaying-means in the absence of said restraining force; means for providing a communicating channel between said relaying point and said other point; means responsive to the attainment of a predetermined magnitude and approximately to alternate half-cycles of a line-current function at the relaying point for initiating an in-feeding of high-frequency current of a predetermined high frequency into the communicating channel approximately during alternate half-cycles of said line-current function at the relaying point; means operative not materially prior to the last-mentioned means for initiating a substantially continuous energization of said electro-responsive operating means; means responsive to the attainment of a predetermined magnitude and approximately to alternate half-cycles of a corresponding line-current function at said other point for initiating an in-feeding of high-frequency current of said predetermined high frequency into the communicating channel approximately during alternate half-cycles of said line-current function at said other point; the approximate half-cycles during which said restraining means is energized in response to line-currents at the relaying point and at said other point, respectively, being approximately in time-phase-opposition with respect to each other, so as to alternate, in the event of a transmission-line fault occurring beyond said other point; and attuned receiving-means at the relaying point for energizing said electro-responsive restraining means in response to high-frequency current of said predetermined high frequency in the communicating channel.

11. The combination, with an alternating-current transmission-line section to be protected, and line-segregating circuit-interrupting means for disconnecting the line from other apparatus, of line-fault-responsive relaying-means for actuating said line-segregating circuit-interrupting means so as to effect a disconnecting operation; said line-fault-responsive relaying-means being of a type which utilizes a current obtained from some other point in the transmission line for assisting in blocking a line-segregating operation in the event of a transmission-line fault occurring beyond said other point; characterized by said line-fault-responsive relaying-means including electro-responsive relaying-means at the relaying point for effecting a predetermined control over the line-segregating circuit-interrupting means; said electro-responsive relaying-means having an electro-responsive restraining means for developing a restraining force, and an electro-responsive operating means for developing an operative force which is effective to quickly cause the actuation of the electro-responsive relaying-means in the absence of said restraining force; means for providing a communicating channel between said relaying point and said other point; means sensitively responsive to the attainment of a predetermined magnitude and approximately to alternate half-cycles of a line-current function at the relaying point for initiating an in-feeding of high frequency current of a predetermined high frequency into the communicating channel approximately during alternate half-cycles of said line-current function at the relaying point and for substantially simultaneously performing an operation necessary to an initiation of a substantially continuous energization of said electro-responsive operating means; means sensitively responsive to the attainment of a predetermined magnitude and approximately to alternate half-cycles of a corresponding line-current function at said other point for initiating an in-feeding of high-frequency current of said predetermined high frequency into the communicating channel approximately during alternate half-cycles of said line-current function at said other point; the approximate half-cycles during which said restraining means is energized in response to line-currents at the relaying point and at said other point, respectively, being approximately in time-phase-opposition with respect to each other, so as to alternate, in the event of a transmission-line fault occurring beyond said other point; less sensitive magnitude-responsive means responsive to successive half-cycles of said line-current function at the relaying point for initiating a substantially continuous energization of said electro-responsive operating means; and attuned receiving-means at the relaying point for energizing said electro-responsive restraining means in response to high-frequency current of said predetermined high frequency in the communicating channel.

12. The combination, with an alternating-current transmission-line section to be protected, and line-segregating circuit-interrupting means for disconnecting the line from other apparatus, of line-fault-responsive relaying-means for actuating said line-segregating circuit-interrupting means so as to effect a disconnecting operation; said line-fault-responsive relaying-means being of a type which utilizes a current obtained from some other point in the transmission line for assisting in blocking a line-segregating operation in the event of a transmission-line fault occurring beyond said other point; characterized by said line-fault-responsive relaying-means including electro-responsive relaying-means at the relaying point for effecting a predetermined control over the line-segregating circuit-interrupting means; said electro-responsive relaying-means having an electro-responsive restraining means for developing a restraining force, and an electro-responsive operating means for developing an operative force which is effective to quickly cause the actuation of the electro-responsive relaying-means in the absence of said restraining force; means for providing a communicating channel between said relaying point and said other point; means responsive to the attainment of a predetermined magnitude and approximately to alternate half-cycles of a line-current function at the relaying point for initiating an in-feeding of high-frequency current of a predetermined high frequency into the communicating channel approximately during alternate half-cycles of said line-current function at the relaying point and for substantially simultaneously performing an operation necessary to an initiation of a substantially continuous energization of said electro-responsive operating means; means responsive to the attainment of a predetermined magnitude and approximately to alternate half-cycles of a corresponding line-current function at said other point for initiating an in-feeding of high-frequency current of said predetermined high frequency into the communicating channel approximately during alternate half-cycles of said line-current function at said other point; the approximate half-cycles during which said restraining means is energized in response to line-currents at the relaying point and at said other point, respectively, being approximately in time-phase-opposition with respect to each other, so as to alternate, in the event of a transmission-line fault occurring beyond said other point; and attuned receiving-means at the relaying point for energizing said electro-responsive restraining means in response to high-frequency current of said predetermined high frequency in the communicating channel.

13. The combination, with an alternating-current electrical apparatus to be protected, said apparatus having a first terminal where current normally enters the apparatus and a second terminal where current normally leaves the apparatus, under predetermined power-flow conditions, of fault-responsive relaying-means, means responsive approximately to alternate half-cycles of a predetermined alternating-current function of current in one of said terminals for producing a first intermittently pulsating restraining force having force-periods each lasting for approximately a half-cycle, alternating with substantially no-force periods lasting for the remaining times between alternate half-cycles of the current in the associated terminal, half-cycles of a corresponding alternating-current function of current in the other terminal for producing a second intermittently pulsating restraining force having force-periods each lasting for approximately a half-cycle, alternating with substantially no-force periods lasting for the remaining times between alternate half-cycles of the current in the associated terminal, the pulsations of said first and second restraining forces being approximately in phase-opposition to each other when fault current is flowing through the protected apparatus to some faulted point outside of the apparatus, and fault-responsive relay-operating means for producing a substantially continuous operating force effective, in less than one-half of a cycle, under fault conditions, to cause a predetermined relay-response when both of said restraining forces have predetermined substantially no-force periods during a predetermined time-interval.

14. The invention as defined in claim 13, characterized by the fact that both of said intermittently pulsating restraining forces are of an approximately limited magnitude not sensitively variable in response to the magnitudes of the currents in the respective terminals of the protected apparatus.

15. The invention as defined in claim 13, characterized by the fact that the pulsations of each of the restraining forces are each of slightly longer duration than one half-cycle of the current in its associated terminal so as to provide a certain predetermined amount of overlapping when fault-current is flowing through the protected apparatus to some faulted point outside of the apparatus.

16. The combination, with an alternating-current electrical apparatus to be protected, said apparatus having a first terminal where current normally enters the apparatus and a second terminal where current normally leaves the apparatus, under predetermined power-flow conditions, of fault-responsive relaying-means, means responsive sensitively to an alternating current of fault-magnitude derived from one of said terminals for initiating the production of a first intermittently pulsating restraining force and for causing the pulsations of said first restraining force to be in time-phase response, in some manner, to the alternations of said current derived from its associated terminal, means responsive sensitively to an alternating current of fault-magnitude derived from the other terminal for initiating the production of a second intermittently pulsating restraining force and for causing the pulsations of said second restraining force to be in time-phase response, in some manner, to the alternations of said current derived from its associated terminal, each of said restraining forces having force-periods each lasting for approximately a half-cycle, alternating with substantially no-force periods lasting for the remaining times between alternate half-cycles of the current in the associated terminal, the pulsations of said first and second restraining forces being approximately in phase-opposition to each other when fault-current is flowing through the protected apparatus to some faulted point outside of the apparatus, and means responsive, in some measure, to the same derived current as one of said restraining-force-initiating means, and operative subsequently thereto, for initiating a substantially continuous operating force effective, in less than one-half of a cycle, to cause a predetermined relay-response when both of said restraining forces have predetermined substantially no-force periods during a predetermined time-interval.

17. The invention as defined in claim 16, characterized by the fact that both of said intermittently pulsating restraining forces are of an approximately limited magnitude not sensitively variable in response to the magnitudes of the currents in the respective terminals of the protected apparatus.

18. The invention as defined in claim 16, characterized by the fact that the operating and restraining forces are of an approximately limited magnitude not sensitively variable in response to the magnitudes of the alternating currents by which they are controlled.

19. The invention as defined in claim 16, characterized by the fact that the pulsations of each of the restraining forces are each of slightly longer duration than one half-cycle of the current in its associated terminal so as to provide a certain predetermined amount of overlapping when fault-current is flowing through the protected apparatus to some faulted point outside of the apparatus.

20. The combination, with an alternating-current electrical apparatus to be protected, said apparatus having a first terminal where current normally enters the apparatus and a second terminal where current normally leaves the apparatus, under predetermined power-flow conditions, of fault-responsive relaying-means, means responsive sensitively to an alternating current of fault-magnitude derived from one of said terminals for initiating the production of a first intermittently pulsating restraining force and for causing the pulsations of said first restraining force to be in time-phase response, in some manner, to the alternations of said current derived from its associated terminal, means responsive sensitively to an alternating current of fault-magnitude derived from the other terminal for initiating the production of a second intermittently pulsating restraining force and for causing the pulsations of said second restraining force to be in time-phase response, in some manner, to the alternations of said current derived from its associated terminal, each of said restraining forces having force-periods each lasting for approximately a half-cycle, alternating with substantially no-force periods lasting for the remaining times between alternate half-cycles of the current in the associated terminal, the pulsations of said first and second restraining forces being approximately in phase-opposition to each other when fault-current is flowing through the protected apparatus to some faulted point outside of the apparatus, fault-responsive relay-operating means for producing a substantially continuous operating force effective, in less than one-half of a cycle, to cause a predetermined relay-response when both of said restraining forces have predetermined substantially no-force periods during a predetermined time-interval, and means for insuring the delay of the effective application of said operating-means which causes the predetermined relay-response until approximately the beginning of one of the force-periods of one of said intermittently pulsating restraining forces.

21. The invention as defined in claim 20, characterized by the fact that both of said intermittently pulsating restraining forces are of an approximately limited magnitude not sensitively variable in response to the magnitudes of the currents in the respective terminals of the protected apparatus.

22. The invention as defined in claim 20, characterized by the fact that the pulsations of each of the restraining forces are each of slightly longer duration than one half-cycle of the current in its associated terminal so as to provide a certain predetermined amount of overlapping when fault-current is flowing through the protected apparatus to some faulted point outside of the apparatus.

23. The combination, with an alternating-current electrical apparatus to be protected, said apparatus having a first terminal where current normally enters the apparatus and a second terminal where current normally leaves the apparatus, under predetermined power-flow conditions, of fault-responsive relaying-means, means responsive sensitively to an alternating current of fault-magnitude derived from one of said terminals for initiating the production of a first intermittently pulsating restraining force and for causing the pulsations of said first restraining force to be in time-phase response, in some manner, to the alternations of said current derived from its associated terminal, means responsive sensitively to an alternating current of fault-magnitude derived from the other terminal for initiating the production of a second intermittently pulsating restraining force and for causing the pulsations of said second restraining force to be in time-phase response, in some manner, to the alternations of said current derived from its associated terminal, each of said restraining forces having force-periods each lasting for approximately a half-cycle, alternating with substantially no-force periods lasting for the remaining times between alternate half-cycles of the current in the associated terminal, the pulsations of said first and second restraining forces being approximately in phase-opposition to each other when fault-current is flowing through the protected apparatus to some faulted point outside of the apparatus, and less sensitive magnitude-responsive means responsive, in some measure, to successive half-cycles of one of said derived currents for initiating a substantially continuous operating force effective, in less than one-half of a cycle, to cause a predetermined relay-response when both of said restraining forces have predetermined substantially no-force periods during a predetermined time-interval.

24. The invention as defined in claim 23, characterized by the fact that both of said intermittently pulsating restraining forces are of an approximately limited magnitude not sensitively variable in response to the magnitudes of the currents in the respective terminals of the protected apparatus.

25. The invention as defined in claim 23, characterized by the fact that the operating and restraining forces are of an approximately limited magnitude not sensitively variable in response to the magnitudes of the alternating-currents by which they are controlled.

26. The invention as defined in claim 23, characterized by the fact that the pulsations of each of the restraining forces are each of slightly longer duration than one half-cycle of the current in its associated terminal so as to provide a certain predetermined amount of overlapping when fault-current is flowing through the protected apparatus to some faulted point outside of the apparatus.

27. The invention as defined in claim 7, characterized by each of said means for causing the feeding of high-frequency current comprising a high-frequency oscillator-tube, and said line-current functions at the relaying and other point each comprising a source of relatively low-frequency control-current for controlling its associated oscillator-tube, the operative control-means between each control-current and its controlled oscillator-tube comprising an oscillator-energizing transformer comprising an iron-core magnetic circuit, a secondary winding connected as a plate-voltage source for said oscillator-tube, and a primary winding, a primary resistor shunting said primary winding, means serially including said primary resistor, a source of unidirectional voltage and a control-tube for energizing said primary winding, and control-means responsive, in some manner, to successive half-waves of said low-frequency control-current for alternately rendering said control-tube conducting and substantially non-conducting, at least under fault-conditions of the transmission-line, the time-constant of the transformer being such that it will continue to change its flux throughout all of each of its discharge-periods.

28. The invention as defined in claim 7, characterized by each of said means for causing the feeding of high-frequency current comprising a high-frequency oscillator-tube, and said line-current functions at the relaying and other point each comprising a source of relatively low-frequency control-current for controlling its associated oscillator-tube, the operative control-means between each control-current and its controlled oscillator-tube comprising an oscillator-energizing transformer comprising an iron-core magnetic circuit with an air-gap in it, a secondary winding connected as a plate-voltage source for said oscillator-tube, and a primary winding, a discharging resistor shunting said primary winding, means serially including said primary winding, a source of unidirectional voltage and a normally conducting control-tube for energizing said primary winding, and control-means utilizing less than all of alternate half-waves of said low-frequency control-current for intermittently rendering said control-tube substantially non-conducting, the secondary winding being connected to the oscillator-tube in such polarity that the oscillator-tube is oscillating at approximately the same time that the control-tube is conducting, the time-constant of the transformer being such that it will continue to change its flux during its discharge-periods when it is supplying plate-circuit energy to the oscillator-tube.

BERNARD E. LENEHAN.